United States Patent [19]

Moe et al.

[11] Patent Number: 5,675,503
[45] Date of Patent: Oct. 7, 1997

[54] ADAPTIVE LOAD CYCLER FOR CONTROLLED REDUCTION OF ENERGY USE

[75] Inventors: Maynard L. Moe, Denver; Theodore A. Hedman, Littleton, both of Colo.

[73] Assignee: Denver Energy Cost Controls, Inc., Denver, Colo.

[21] Appl. No.: 229,622

[22] Filed: Apr. 19, 1994

[51] Int. Cl.⁶ .................................. H02J 3/18; G05F 1/66
[52] U.S. Cl. .................. 364/492; 364/483; 364/557; 307/32; 307/39
[58] Field of Search .......................... 364/492, 493; 307/31–39

[56] References Cited

U.S. PATENT DOCUMENTS

| | | | |
|---|---|---|---|
| 4,023,043 | 5/1977 | Stevenson | 307/38 |
| 4,168,491 | 9/1979 | Phillips et al. | 364/492 |
| 4,228,511 | 10/1980 | Simcoe et al. | 364/493 |
| 4,337,401 | 6/1982 | Olson | 307/39 |
| 4,345,162 | 8/1982 | Hammer et al. | 364/493 |
| 4,357,665 | 11/1982 | Korff | 364/493 |
| 4,360,881 | 11/1982 | Martinson | 364/493 |
| 4,389,577 | 6/1983 | Anderson et al. | 364/493 |
| 4,477,733 | 10/1984 | Herdeman | 364/493 |
| 4,819,180 | 4/1989 | Hedman et al. | 364/492 |
| 4,977,715 | 12/1990 | Rudden et al. | 364/492 |
| 5,017,799 | 5/1991 | Fishman | 307/2 |
| 5,107,440 | 4/1992 | Callahn et al. | 364/480 |
| 5,168,170 | 12/1992 | Hartig | 307/35 |
| 5,184,119 | 2/1993 | Stanbury et al. | 340/825.02 |
| 5,436,510 | 7/1995 | Gilbert | 364/492 |

*Primary Examiner*—Emanuel T. Voeltz
*Assistant Examiner*—Kyle J. Choi
*Attorney, Agent, or Firm*—John E. Reilly

[57] ABSTRACT

A method and system for regulating power delivered to specific appliances or loads which represent but a proportion of the power consumed by different commercial or residential users and in which each appliance or load has variable demands for power consumption, the method and system of the present invention being characterized by measuring the natural run time or average demand of an electrical appliance over a selected real time interval and reducing the run time or average demand of the appliance by an amount directly related to the run-time measurement or average demand measurement of each appliance during periods of peak demand.

17 Claims, 8 Drawing Sheets

Microfiche Appendix Included
(2 Microfiche, 63 Pages)

ADAPTIVE LOAD CYCLER FOR CONTROLLED REDUCTION OF ENERGY USE

CROSS REFERENCE TO MICROFICHE APPENDIX

Reference is made to the Microfiche Appendix consisting of 2 microfiche and 63 frames.

This invention relates to a method and apparatus for controlling energy usage; and more particularly relates to a novel and improved method and apparatus for controlled reduction of the energy usage and/or run time of specific appliances which represent only a part of the total power consumption of different commercial or residential users.

BACKGROUND AND FIELD OF THE INVENTION

Energy management schemes have been proposed which require that utility customers limit the electrical power used by electrical appliances, such as, air conditioners, heat pumps, water heaters, baseboard heaters, auxiliary furnaces and the like during periods of anticipated or actual peak demands. Typically, utilities will impose limits on energy usage when the outdoor temperature or humidity is at a high or low extreme condition. For instance, at high outdoor temperatures increased air conditioner use creates electrical demand peaks. In such case a typical control scheme is to limit air conditioner operation by turning the air conditioner off for a portion of a fixed interval of time, such as, 7.5 minutes out of each 30-minute interval during the control period. The control period may be specified by the utility using a radio transmitter and receiver to signal the air conditioner when to be off. Another scheme uses measurement of the temperature in the vicinity of the air conditioner to specify the control period, for example, to keep the air conditioner off 30% of the time when the temperature is above 95° F.

Although the foregoing and other approaches are effective in limiting the energy used by air conditioners during the control periods, they present a number of problems both to the customer and to the utility. The arbitrary selection of the amount of time to keep the air conditioner off during the control period is usually based on a balance between a requirement that the utility receive a reasonable benefit and that the customer does not suffer undue hardship. The benefit to the utility is a decrease in energy use, and the impact on the customer is increased indoor temperature. Such an arbitrary selection may create a wide range of impacts upon different customers and uncertain benefits to the utility.

In many cases the air conditioner does not normally run continuously during periods the utility may want to control. During a control period the air conditioner may naturally be off more than the utility is keeping it off. In this case there is no benefit to the utility and no impact on the customer. In another case the air conditioner may naturally be off for a time period only slightly less than the time the utility keeps the air conditioner off. In this case the utility receives only a slight benefit and the customer only a slight impact. In other cases the air conditioner naturally runs continuously during a period the utility wants to control. In this case the utility receives the greatest benefit and the customer the greatest impact. Since some customers do not provide any benefit to the utility, or only a slight benefit, the utility must control for longer periods or control more customers to achieve a specific level of benefit. Longer periods of control place an increased burden on customers whose air conditioners naturally run continuously during the control period.

In some cases the air conditioner has a variable cooling capacity depending upon the need for cooling and also presents a variable load to the utility. In this case the energy being used, rather than run time, is more indicative of the load presented to the utility. Keeping the air conditioner off for a fixed period may not decrease the average load since the air conditioner may simply increase its energy use over the remaining time. Thus the utility may receive no benefit or only a slight benefit and the customer may receive no impact or only a slight impact.

Previously we devised a variable-limit demand controller system for regulating overall power consumption of each user and is disclosed in U.S. Pat. No. 4,819,180. However, that system is not capable of monitoring and controlling individual appliance energy usage or run time during peak demand periods. However, to the best of our knowledge, no one has devised a method and means by which individual appliances can be controlled during peak demand periods and specifically in such a way as to reduce energy usage and/or run time in direct correlation with ambient conditions and in such a way as to proportionately reduce individual appliance energy consumption in accordance with each consumer's normal demands. Other representative patents are U.S. Pat. No. 4,977,515 to Rudden, U.S. Pat. No. 5,017,799 to Fishman and U.S. Pat. No. 5,168,170 to Hartig.

Although the following detailed description of a preferred embodiment is directed to adaptive control of an air conditioning system, it is to be understood that such is given for the purpose of illustration only and that the method and apparatus of the present invention is readily conformable for use with various appliances.

SUMMARY OF THE INVENTION

Accordingly, it is an object of the present invention to provide for a novel and improved energy management method and system which is highly effective and dependable in use.

It is another object of the present invention to provide for a novel and improved energy management system wherein modification of the operation of the air conditioner can be adjusted in accordance with the actual operation of the air conditioner thereby resulting in equitable impact on each customer and a benefit to the utility.

It is a further object of the present invention to provide for a novel and improved electrical energy management system which permits selection of one of several strategies available to modify the operation of an air conditioner.

It is a further object of the present invention to provide for a novel and improved energy management system which may be used with any of a number of methods of initiating or signaling a control period from a remote location or from a determination of local conditions such as time, humidity and/or temperature.

It is a further object of the present invention to provide for a novel and improved energy management system which can provide equitable energy reduction by either monitoring and controlling the natural run time of the air conditioner or monitoring and controlling the natural energy consumption of the air conditioner.

In this setting, the present invention is characterized by the steps of measuring the natural run time or energy use of each air conditioner for selected temperature and/or humidity ranges, and modifying the energy use by each air conditioner in response to a control signal by an amount correlated with the run time or energy usage measurement of each air conditioner. Preferably, the run time or energy usage of each air conditioner is measured over a predetermined real time interval to generate a pattern of use for the conditions present during the interval, and several such measurements are averaged to determine the average run time or energy use for each temperature and/or humidity range; and such measurements and averages are continually updated between control periods. Thus, for example, when a utility signal is transmitted during periods of peak power usage to signal a control period the actual reduction in run time or energy use will be based upon the average run time or energy use for each air conditioner and the averages for the conditions present at the time the control signal is received. The reduction in run time or energy use may be a percentage of average or a fixed reduction which has been arbitrarily selected by the utility.

Thus, for example, the air conditioner may be allowed to operate only a percentage of the time it would normally operate in the temperature range currently present. As a specific example, if the air conditioner normally operated 20 minutes out of each 30-minute interval then the invention may allow it to operate for 75% of the normal time, or operate for 15 minutes during each 30-minute period.

As another example using a different strategy, the air conditioner may be held off for a fixed time in addition to the time it is naturally off in the temperature range currently present. As a specific example, if the air conditioner was normally off 10 minutes out of each 30-minute interval then the invention may keep it off an additional 25% of the 30-minute interval, or an additional 7.5 minutes, and thus keep it off for 17.5 minutes during each 30-minute period.

Among other desirable features of the present invention is the ability to delay the application of power after a power outage to reduce the total load that must be energized immediately after an outage. In carrying out the foregoing and other advantages and features of the invention, each air conditioner is furnished with an adaptive load cycler which is program controlled to determine average run time or average energy use and to reduce same in response to a control signal received from a remote location or determined by local time, temperature, and humidity.

The above and other objects, advantages and features of the present invention will become more readily appreciated and understood from a consideration of the following detailed description of a preferred embodiment of the present invention when taken together with the accompanying drawings of a preferred embodiment of the present invention in which:

DETAILED DESCRIPTION OF THE PREFERRED EMBODIMENT

Figure 1:
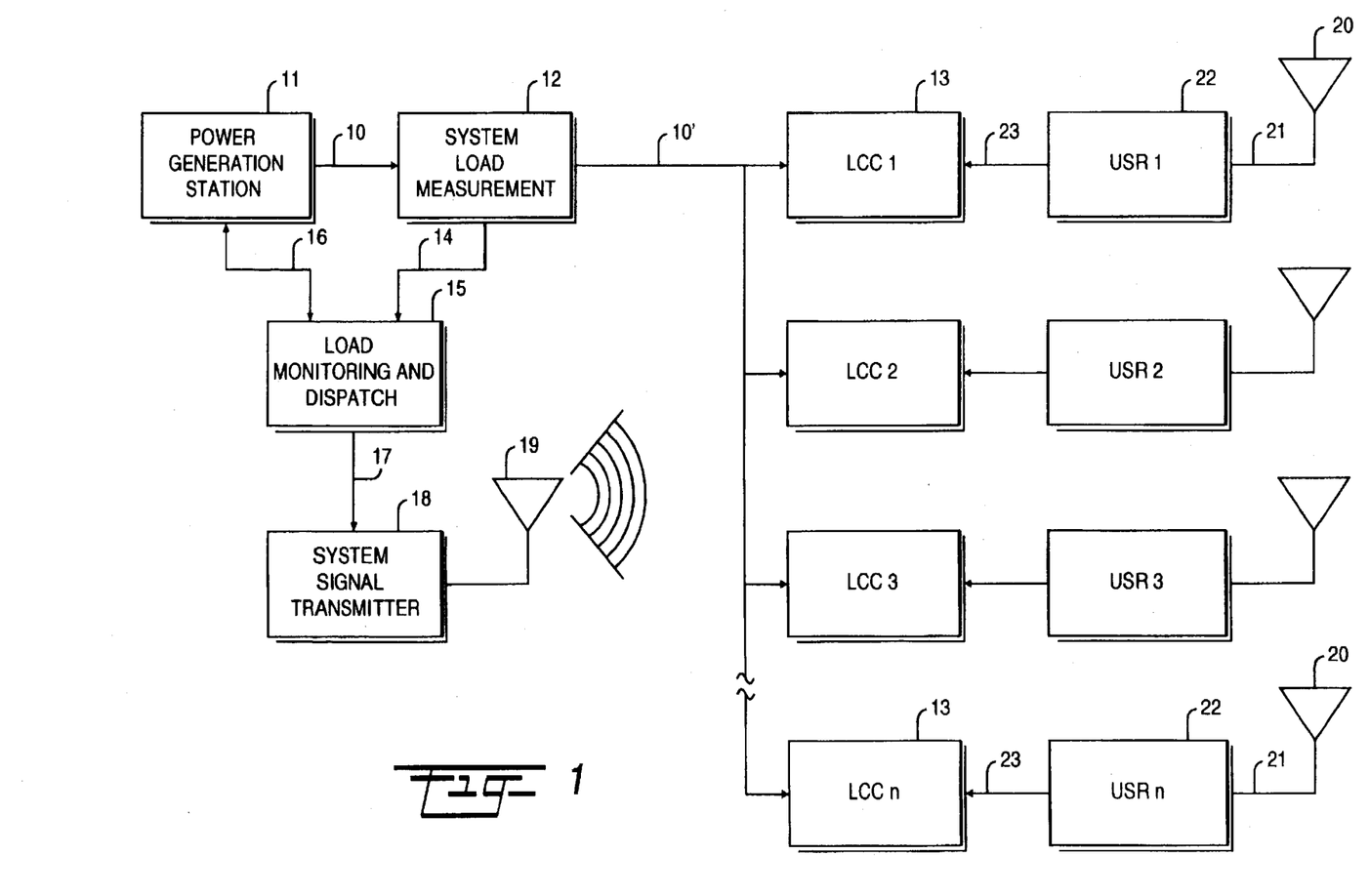
FIG. 1 is a block diagram of a typical electrical power generation and distribution system.

Referring in more detail to the drawings, there is shown by way of illustrative example in FIG. 1 a utility power generation and distribution system for a plurality of individual consumers in which power from a power generating source 11 is transmitted over line 10 through system load measurement facilities 12 to a plurality of individual load control circuits 13 via line 10'. An individual load control circuit 13 is located at each customer building or residence, and the power consumed by those circuits is monitored by the system load measurement facility 12 and the information then delivered over line 14 to a load monitoring and dispatch facility 15. Additional information is supplied over line 16 to the facility 15 from the power source 11 relating to the status of the various elements in the power generation facilities, such as, total available power. The information from the power source 11 and the system load measurement 12 is utilized to make decisions in the monitoring and dispatch facility 15 as to whether the total load on the power source 11 must be decreased or increased and the amount of such decrease or increase. These decisions, in the form of demand limit increase or decrease signals are sent to a system signal transmitter 18 which transmits the signals via radio transmitting antenna 19 to a plurality of receiving antennas 20, each antenna 20 transferring the signal via line 21 to a utility signal receiver 22 which is connected via line 23 to one of the load control circuits 13. It should be noted that the system signal transmitter 18 and the utility signal receiver 22 represent a system that transmits and receives a control signal, such systems could as well be a power line carrier system, a telephone system, a cable system, etc.

For the purpose of illustration, the decision is made at the dispatch facility 15 that the total load on the power source 11 must or should be reduced by a selected amount, and a command is delivered from the transmitter antenna 19 to each of the receiver antennas 20 to signal each load control circuit 13 to start reducing the load, such reduction based on the energy usage pattern of each customer in a manner to be hereinafter described in more detail. In accordance with standard practice, one or more signals may be delivered by the antenna 19 to each of the receiver antennas 20 to effect the ultimate desired reduction in load on the power source. In a similar manner, a utility may determine through its load monitoring and dispatch facilities 15 that the total load on the power source 11 may be increased, as a result of which signals are delivered via the antenna 19 to effect an increase in load at each load control circuit 13. Most importantly, however, the utility company's objective of reducing the system load can be fulfilled with proportionate impact upon each consumer, since in a manner to be described the amount of load reduction is based on the individual consumer's energy usage pattern; and each consumer is subjected to precisely the same utility control signal which will operate to reduce each customer's demand limit by a corresponding percentage of the customer's actual usage of energy preceding the application of the control signal. Correspondingly, if additional power is available, the energy available for each customer may be increased by an equal percentage or rate.

Figure 2:
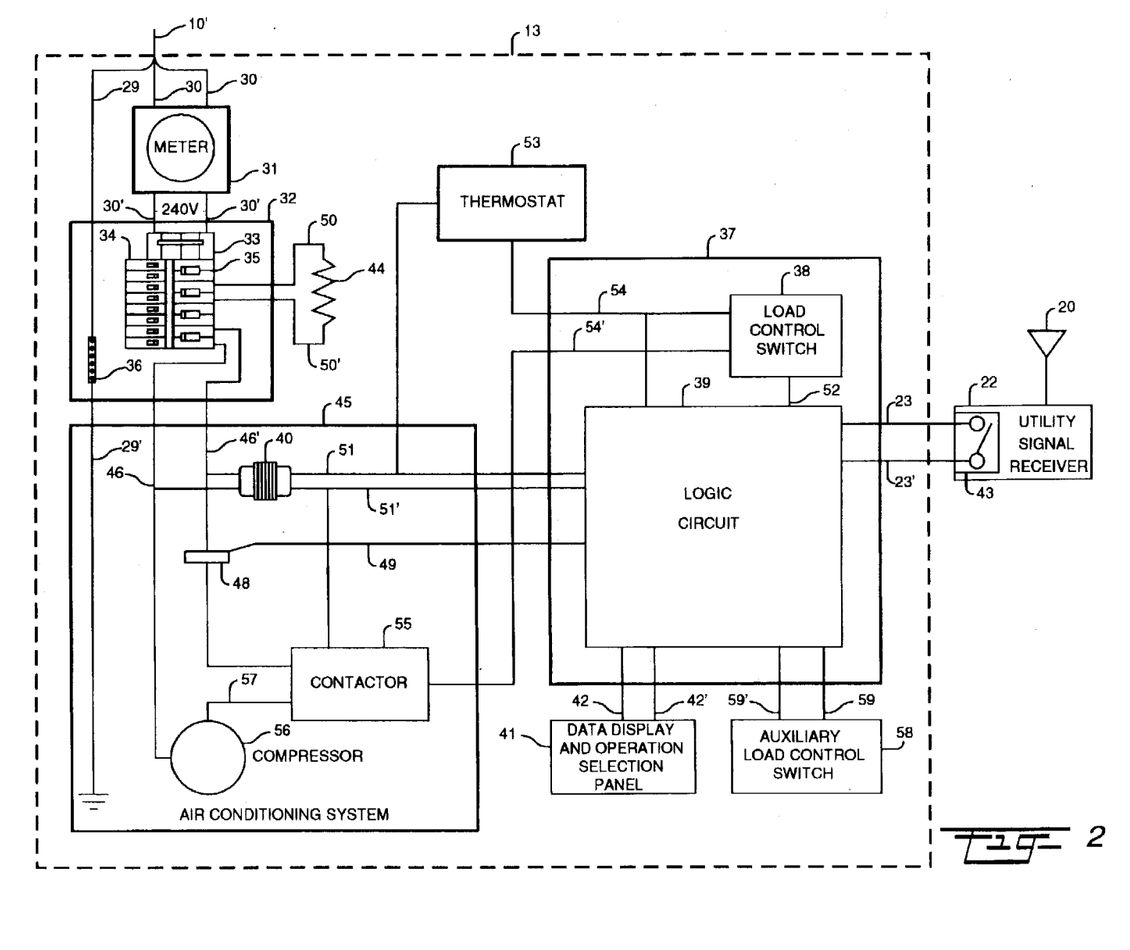
FIG. 2 illustrates somewhat schematically a load control circuit at each consumer's location in accordance with the present invention.

A preferred form of load control circuit 13 at each customer's location is illustrated in FIG. 2. Here, the power which is delivered from the power source 11 is applied over two or more power delivery lines 30 and a neutral line 29 for delivery to the circuit 13 and measured by a conventional metering device 31 for utility billing purposes. The meter 31 is connected to each consumer's main electrical distribution panel 32 which typically comprises a main circuit breaker 33, a plurality of single pole circuit breakers 34, a plurality of double pole circuit breakers 35, and an earth ground terminal block 36. A variable limit or adaptive cycle controller 37 controls the rate of energy usage in the control circuit 13 and consists of one or more load control switches 38 and a logic circuit 39 which contains the logic necessary to operate the switch 38. A voltage reducing transformer 40, which may be located external to the controller 37, supplies power at logic voltage levels to the controller 37 via lines 51 and 51'. A conventional data display panel 41 is connected to the logic circuit 39 via lines 42 and 42' to allow the consumer to monitor the operation of the circuit 13 and to allow utility personnel to modify the operation of the controller 37 for functions related to operational control parameters. The logic circuit 39 is connected via lines 23 and 23' to a plurality of switch contacts 43 within the receiver 22. The contacts 43 may open or close in response to a utility control signal to indicate that utility control is active and to instruct the controller to operate in a predetermined manner. The length of time that the contacts 43 are actively requesting control is determined by the length of the peak load that the utility is experiencing and typically may be one to eight hours in duration.

A plurality of uncontrolled loads are represented at 44 and are made up of loads which are not under the influence of the controller 37, such as, refrigerators, lighting circuits and small appliances. The loads 44 are connected to the circuit breakers 34 and 35 by line connections 50 and 50'. Likewise, a plurality of controlled loads are designated at 45, illustrated in FIG. 2 as an air conditioning system, which are under the influence of the controller 37. The air conditioning system 45 is merely representative of various controlled loads, such as, heating, cooling and controllable large appliance circuits, and the system or load 45 is connected to the circuit breakers 34 and 35 and routed via lines 46 and 46'. Line 46 is directed through a high current load switching contactor 55 to the compressor 56 via line 57 as shown. The contactor 55 is controlled through the load switch 38 of the controller 37 via lines 51' and 54'. The load control switches 38 are controlled by the logic circuit 39 via line 52. In turn, lines 46 and 46' deliver power from the circuit breaker 35 to the transformer 40 in order to provide a control circuit for the load 45 and also to energize the controller 37 via lines 51 and 51'. The thermostat 53 provides a means of controlling the controlled load contactor 55 via lines 54 and 54', the latter being routed through the load switch 38 of the controller 37 to provide a means to interrupt normal operation of the load 45. Line 54 is also routed to the logic circuit 39 to provide information as to the status of the thermostat 53 and as alternate means for providing power to the logic circuit 39 if required. The energy usage of a controlled load 45 is measured by the power usage sensor circuit which is in the form of current sensing transformer 48 on the power line 46', and the energy usage information or data is delivered to the logic circuit 39 via line 49. The energy usage data thus obtained is used by the logic circuit 39 to develop an energy usage pattern for loads which vary their energy usage for different ambient conditions. For example, an air conditioner may have a variable load either because it has a second stage compressor unit or the speed of the compressor varies with the load required for the ambient conditions.

Figure 3:
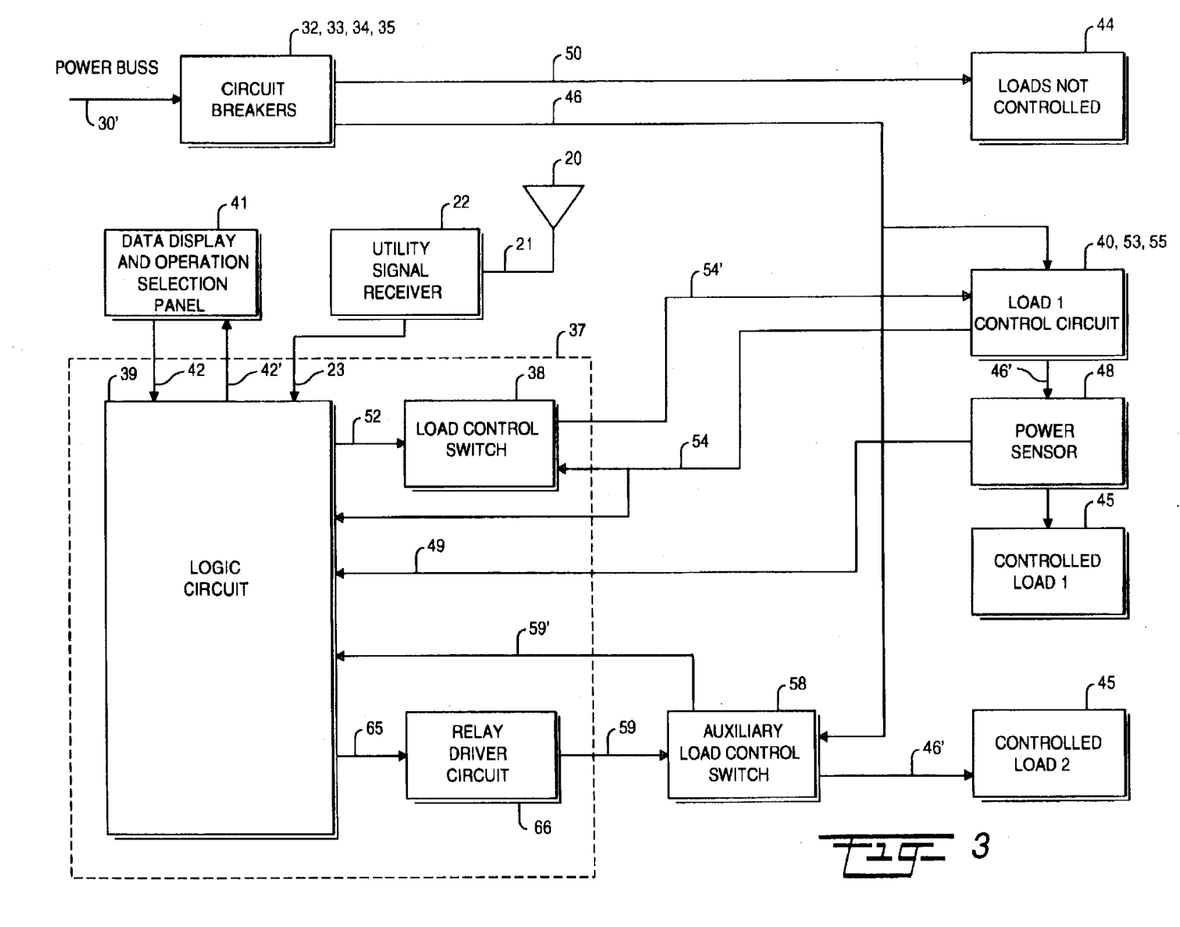
FIG. 3 is a block diagram illustrating a variable demand limit controller forming a part of the load control circuit in accordance with the present invention.

The load control circuit 13, as further illustrated in FIG. 3, includes a plurality of relay driver circuits 66 which are controlled via line 65 of the logic circuit 39 to control one or more auxiliary load control switches 58 via line 59. Each auxiliary load control switch 58 operates in a well-known manner to control auxiliary loads 45, such as, a water heater to obtain greater load reduction. A data display and operation selection panel 41 is connected via lines 42 and 42' to the logic circuit 39 in order to permit utility personnel to enter operational parameters into memory locations in the logic circuit. Those operational parameters are, for example, percentage reduction levels, temperature control levels or time period selections from which the control signal is generated to initiate adaptive cycling during periods of peak demand. For example, if the ambient temperature exceeds a particular level, a control signal is generated to open the load control switch 38. At that point, normal operation of the load 45 is modified or reduced by an amount or percentage which is correlated with the average run time or energy usage measurements stored in a scratch pad memory 71 to be hereinafter described.

Relay driver circuit 66 which is controlled via line 65 of the logic circuit 39, serves to control an auxiliary controlled load 2 45 by using the auxiliary load control switch 58 which is controlled via line 59. The method and frequency of control for auxiliary controlled load 45 may be specified and inserted into the logic circuit 39 by means of the data display and operation selection panel 41. Line 59' from auxiliary load control switch 58 may be used as an additional signal input to the logic circuit 39 or for powering the controller 37. The auxiliary load control switch 58 represents a more traditional manner of regulating a controlled load 45, designated as "controlled load 2", exclusively in response to a control signal whether from the utility signal receiver 22 or from an internal control signal and is provided herein more for the purpose of illustrating the ability of the load control switch 38 to operate alone or in combination with the auxiliary load control switch 58.

The utility signal receiver 22 provides additional control information to the logic circuit 39 via line 23. Utility load monitoring and dispatch 15 can monitor system load, and in the case of system peaking, can send a signal to start load reduction via line 17, the system signal transmitter 18 and the antenna 19 to the local antenna 20 and via line 21 to the utility signal receiver 22. The load 1 control circuit is made up of the power supply transformer 40, the thermostat 53 and the load switching contactor 55 and provides information on the operation of the controlled load 45; also, it provides a source of power for the logic circuit 39 and a means to control the load by the load control switch 38. Line 54 from the thermostat 53 provides a signal which tells the logic 39 whether or not the thermostat 53 is requesting load operation and this information is used in determining the natural run time of the load 45. Line 54 or 54' also provides a power source to operate the controller 37. The contact in the load control switch 38 closes to provide the thermostat signal via line 54' to the load 1 control circuit to energize controlled load 1 45. Likewise, the contact in the load control switch 38 may open to interrupt the thermostat signal to line 54' to deenergize the load 1 control circuit to provide control of controlled load 1 45. Further, an alternate, or secondary, means of collecting additional load power usage information is provided via line 49 from the power sensor 48 which measures the power usage of controlled load 1 45. When the load of controlled load 1 is a constant, line 54 provides sufficient information to determine the natural run time of the load. For instance, when the power or energy usage of the load is variable, i.e., a two stage compressor unit or a variable speed load, line 54 information is not sufficient for determining control strategy. Therefore, the power sensor 48 provides the information about the energy use of the load so that an optimum control strategy may be determined. In this way, optimum load control is achieved by using a combination of historical control condition data, emergency dispatch via radio signal, thermostat operating interval measurements, and, if the load size is a variable, the energy use of the controlled load.

Figure 4:
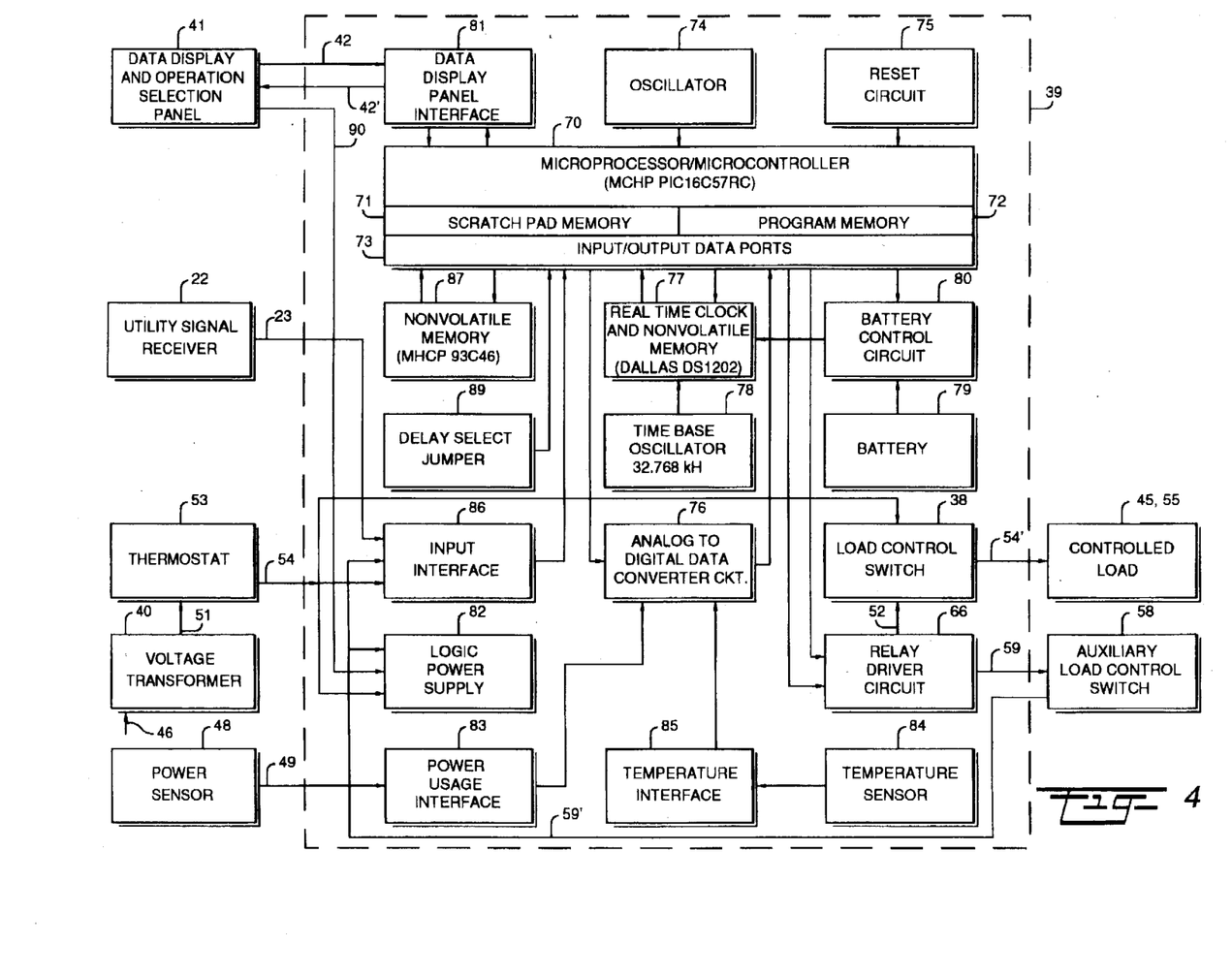
FIG. 4 is a block diagram of the controller logic circuit in accordance with the present invention.

More detailed elements of the logic circuit 39 are illustrated in FIG. 4 including the industry type number for those integrated circuits used to implement the design of the logic. As shown, a microcontroller 70 is interconnected via an internal data buss to program memory 72, scratch pad memory 71, and input/output data ports 73. The memory 72 contains the program control required to make the processor 70 operate the controller logic circuit 39. The scratch pad memory 71 is a random access memory used by the microprocessor 70 to store temporary and changing data, such as, energy usage patterns, timing intervals and mathematical results. The input/output data ports 73 provide digital input information via the inputs to the microprocessor 70 and digital data output information is sent by the microprocessor 70 to control the loads and other circuit functions. An oscillator 74 defines a high frequency clock source to step the microprocessor 70, and a reset circuit 75 will initialize the logic circuit when power is applied. The analog to digital data converter 76 converts analog data into binary data for the processor 70.

The microcontroller 70 must perform some of its functions based on real time provided by the real time and nonvolatile memory circuit 77 via input/output data ports 73. The real time clock 77 derives its time base from the frequency of the time base oscillator 78. The nonvolatile memory in circuit 77 is used to store operating data parameters. The battery 79, via the battery control circuit 80, supplies power to maintain the time and nonvolatile data memory during power outages. The microcontroller 70 controls the battery control circuit 80 to optimize battery life. The microcontroller 70 is also connected to the data display panel interface 81 with one input line and one output line to receive and send data, respectively, to the optional data display and operation selection panel 41 via lines 42 and 42'. The panel 41 has an optional output line 90 to the logic power supply 82 to power the logic circuit 39 if it is not otherwise powered. The power sensor defined by the current sensing transformer 48 inputs the load measuring information signal via line 49 to a power usage interface 83 which scales the signal to a meaningful level for insertion into the analog to digital converter 76. The temperature sensor 84 also feeds its signals to the temperature interface 85 in scaling the information for insertion into the analog to digital converter 76. Utility control signals which appear at the contacts 43 of the utility signal receiver 22 are input via line 23 to the input interface 86 which filters the signals and scales the signal level for insertion into the input data port 73 of the device 70. The auxiliary load control switch 58 may provide via line 59' an additional signal to input interface 86 for insertion into the input data port 73 of the device 70 to further modify controller operation. Line 59' of the auxiliary load control switch 38 is also routed to the logic power supply 82 where it may be optionally used as an alternative power source for the logic circuit 39. The logic power supply 82 generates a direct current voltage to operate the controller logic.

The preferred power source for the logic circuit 39 is supplied from the line 46 and applied to the voltage transformer 40 where it is input over line 51 via the thermostat 53 to line 54 and into the logic power supply 82. Line 54 is also routed to the input interface 86 to supply a signal to the microcontroller 70 via the input/output port 73 to obtain information on the operation of the thermostat 53 which reflects the load requirements and operating pattern of the controlled load 45. Further, line 54 is routed through the load control contact contained in load control switch 38 to line 54' which completes the path of line 54 back to the control circuitry of load 45. When the contact of the load control switch 38 is closed, the signal from the thermostat 53 directly operates load 45 via its contactor 55. When the contact of the load control switch 38 is opened, the signal from the thermostat 53 to the contactor 55 is interrupted and the load is controlled by the logic circuit 39.

The non-volatile memory 87 is an integrated circuit which is capable of memory retention when no power is supplied to it, and is used to store parameters including data that the logic generates in case there is a power failure. The memory 87 preferably includes a signal input/output configuration and therefore sends data to input/output data port 73 as well as receives data and clocking signals from the input/output data port 73. In order to control the load control switches 38, the microprocessor sets the output data status on the input/output data port 73 which is directed to the relay driver circuit 66, then to the load control switch 38 via line 52. A delay select jumper 89 provides a convenient mechanical means for changing a logic operating parameter by changing the position of the jumper to modify data input at the data port 73 of the microcontroller 70.

Figure 5:
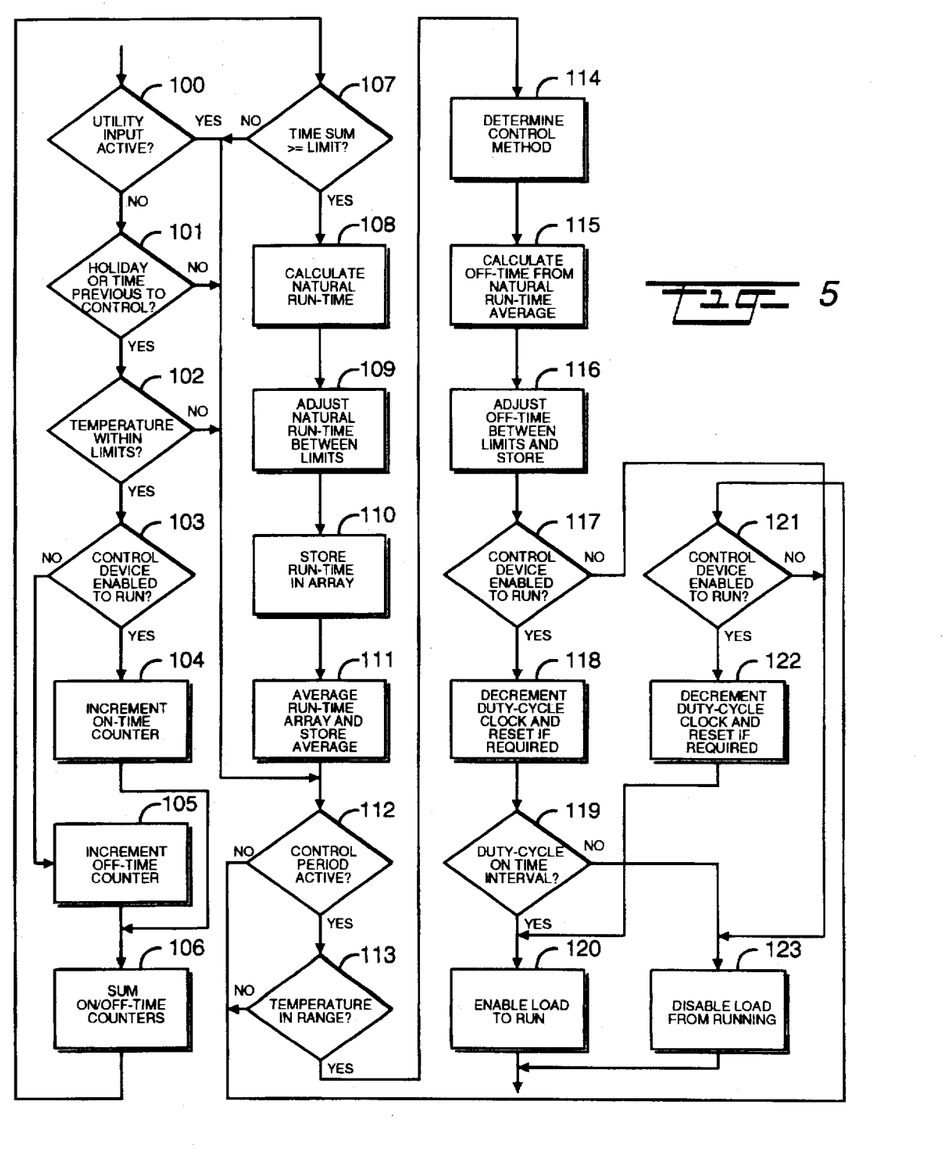
FIG. 5 is a flow chart illustrating one form of logic employed in the limit controller of the present invention.
Figure 6:
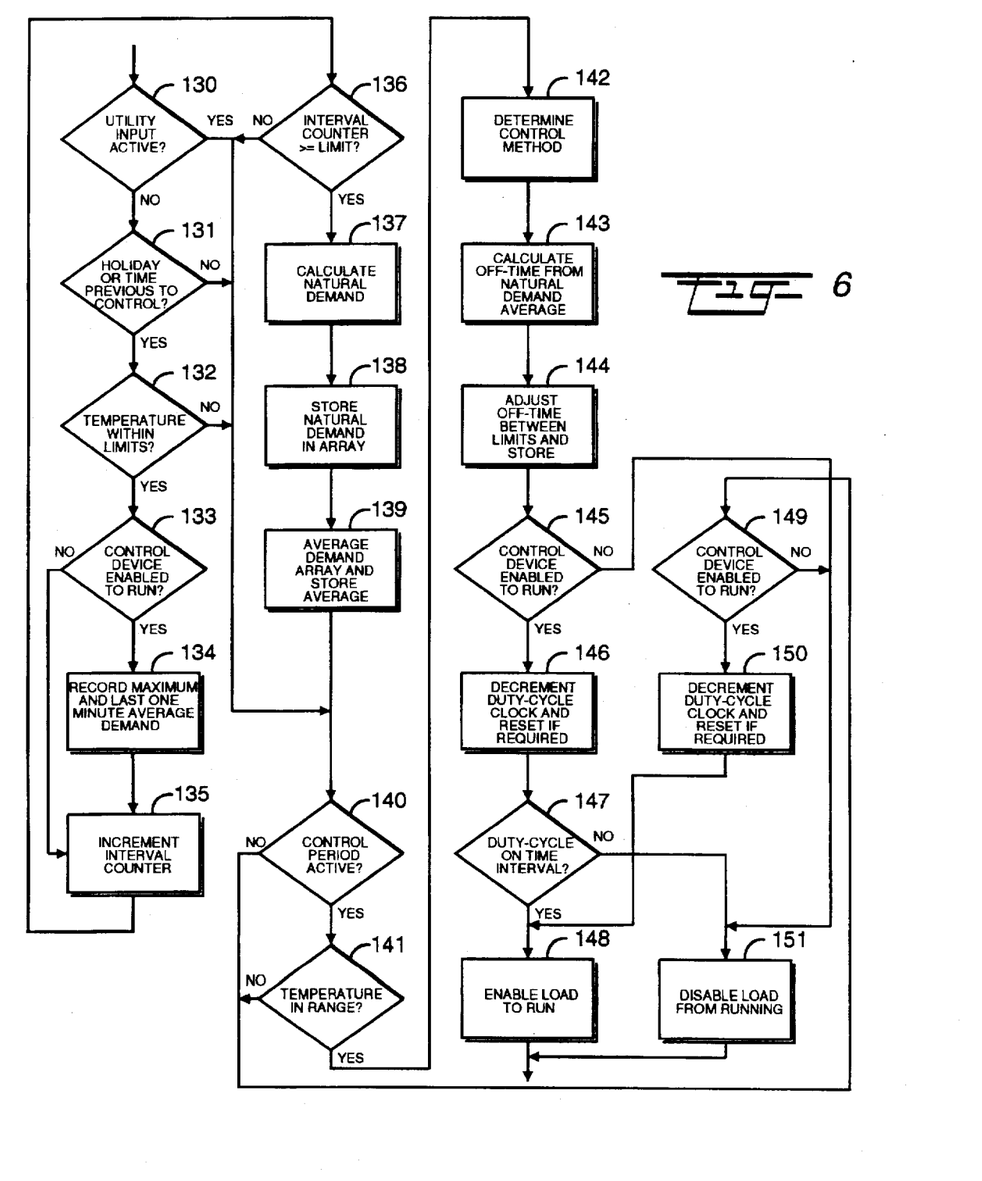
FIG. 6 is a flow chart illustrating one form of logic employed in the limit controller of the present invention.

As a preliminary to a description of the flow charts shown in FIGS. 5 and 6, the following definitions are believed helpful to an understanding of the present invention:

NATURAL RUN TIME: The portion, measured in time, of a fixed time interval in which a load runs at selected operating conditions. For example, an air conditioner may average 20 minutes of run time during 30 minute intervals when the outdoor temperature is in the range of 90° to 95° F., thus establishing a natural run time of 20 minutes.

FIXED LOAD: A load which predominantly runs at a constant energy level. For example, a single stage air conditioner which operates at 4 kW.

VARIABLE LOAD: A load which operates at two or more fixed energy levels or a load which variably operates between a lower energy level and an upper energy level for the purpose of obtaining the desired output. For example, a two stage air conditioner which operates at either 4 kW or 8 kW or a variable speed air conditioner which operates between 4 kW and 8 kW.

USAGE PATTERN: A variable length array of energy usage data which is collected by the controller 37 over incremental units of time to obtain a pattern of the energy usage of an appliance. For example, an array which contains energy usage data for sixteen one hour increments.

ADAPTIVE LOAD VALUE: A value which is mathematically derived from the usage pattern of a variable load to fairly represent the data in that pattern. The value derived is used as a basis for calculations during an interval where control is desired. For example, the average of the usage pattern data over sixteen hours may be calculated to obtain a value for the adaptive average.

The computer program code including that portion which resides in program memory 72 of FIG. 4 has been deposited with the Patent Office pursuant to 37 C.F.R. §1.96 and is incorporated by reference herein. Only that part of the program which is applicable to adaptive load cycling of fixed load size equipment operation is hereinafter described by reference to the flow chart of FIG. 5 and that part of the program which is applicable to adaptive load cycling of variable load size equipment operation is hereinafter described by reference to the flow chart of FIG. 6 wherein computer function steps are indicated within rectangles and logic steps or decisions within parallelograms. With reference to FIG. 5, the program as represented by the flow chart is entered periodically, such as, on the order of every 60 seconds, by a time based signal generated from the real time clock 77. At 100 inquiry is made as to whether or not the receiver contacts 43 of the utility signal receiver 22 are active to request utility control. If the contacts are active the program proceeds to 112; but if they are not active, the program proceeds to 101 where the logic determines weather or not the present time falls during a holiday or is a time previous to a pending control period. If it is not a holiday or if the time is during or after a control period which may occur the program advances to 112; but if a holiday is active or if the time is previous to a control interval the program proceeds to 102 where to logic determines whether or not the temperature measured by temperature sensor 84 is within predetermined limits. If the temperature is not within limits the program advances to 112; but if the temperature is within limits the program proceeds to 103 where the logic reads input 54 from the thermostat 53 to determine if the thermostat is requiring the air conditioner to operate because at this point the logic knows that the air conditioner is probably running undisturbed in its natural operating cycle at the temperature range of interest. If the thermostat input is active, the program proceeds to 104 where the logic increments the on time counter to indicate that one minute of run time has occurred; if the thermostat input is inactive, the program proceeds to 105 where the logic increments the off-time counter to indicate that the load has been off for one minute. Upon either event the program continues to 106 where the on time and off time counters are summed to determine the size of the combined counters and the program continues to 107 where the sum is compared to a predetermined limit to determine if the quantity of time data is sufficient for further processing. If the data accumulated is not sufficient the program continues at 112; if the data accumulated is sufficient the program continues at 108 where the natural run time is computed from the data in the on time and off time counters. Following 108 the program steps to 109 where the result is compared, and if required adjusted, to predetermined limits to insure that irregularities have not corrupted the result. When the comparison and adjustment is completed, the program steps to 110 to remove the oldest natural run time data from an array of natural run time data storage locations in the memory 77 and inserts the newly accumulated natural run time data into the array. At 111, the logic accesses the usage data stored to determine a value for the natural run time; i.e., the average time a load operates during a predetermined real time interval. In the case shown, the logic sums the array and divides the total by the number of entries in the array to obtain the average and this is stored in the temporary memory 71 for subsequent use as the natural run time value. The logic at 111 stores the new natural run time value in the memory 87 to preserve it in the event of a power failure which would cause the memory 71 to lose its contents.

In the routine as described, the interval wherein the absence of a utility control signal, the absence of a predetermined timed control period, and with the temperature in a predetermined temperature range, the controller logic 39 will collect the operating data and determine the natural run time value. This is the most realistic time to collect usage data because at other times when control is active, has just been active, or the temperature is not within limits, constraints are imposed on the operation of the monitored load such that the operating data may not reflect the true operation patterns. The program then steps to 112 where it would also arrive if any of the prior conditional tests failed and the logic did not follow the previously discussed path. At 112, the logic determines if a control period is active and if not the program steps to 121; if a control period is active the program steps to 113 to determine if the temperature is in the prescribed temperature range for control. If the temperature is not in the control range, the program steps to 121; if the temperature is in the control range, the program steps to 114 where it accesses operational data from memory 87 to determine the preselected control method in which to operate. The program then steps to 115 where the appropriate formulas and operating parameters are retrieved and the calculations are made to determine the off time, the amount of time the controlled load will be locked off, to be used during each control cycle. At 116 the newly calculated off time is compared to predetermined limits and adjusted to the limits if required, to assure a realistic value is achieved from the calculations. The program then steps to 117 where input line 54 is again interrogated to see if the thermostat 53 is requiring the load to be on. If the signal on line 54 is not requesting operation, the program steps to 123 where the load switch 38 is deactivated to prevent operation of the controlled load; if the signal on line 54 is requiring the load to be on, the program steps to 118 where the logic decrements a down counter register in memory 71 which is used as a clock to define the control cycle. If decrementing the cycle register results in zero or a negative count, the logic accesses the preselected cycle period from non-volatile memory 87 and resets the counter to the full cycle period. At 119 the time remaining on the cycle clock is compared to the newly calculated off time to determine if either the on time or off time interval of the cycle is active. If the cycle count is less than or equal to the calculated off time, the logic steps to 123, which is also the negative route from 117, where the load switch 38 is deactivated to prevent operation of the controlled load; if the cycle count is greater than the calculated off time, the program steps to 120 where the load switch 38 is activated to enable operation of the controlled load.

In the routine as described, a negative route from 112 or 113 steps the program to 121 where input line 54 is again interrogated to see if the thermostat 53 is requiring the load to be on. If the signal on line 54 is not requesting operation, the program steps to 123, which is also the negative route from 117 and 119, where the load switch 38 is deactivated to prevent operation of the controlled load; if the signal on line 54 is requiring the load to be on, the program steps to 122 where the cycle clock is decremented and reset if required as described in 118. The cycle clock is decremented in this manner to force the cycle clock to be as random in its cycle as the operation of the controlled load is random in its operation. This precaution leads to a random overall system when many of these controllers compose the system. After operation at 122 the program steps to 120, which is also the positive route from 119, where the load switch 38 is activated to enable operation of the controlled load.

That part of the program which is applicable to adaptive load cycling of variable load size equipment operation is described by reference to the flow chart of FIG. 6, where the program as represented by the flow chart is entered periodically, such as, on the order of every 60 seconds, by a time based signal generated from the real time clock 77. At 130 inquiry is made as to whether or not the receiver contacts 43 of the utility signal receiver 22 are active to request utility control. If the contacts are active the program proceeds to 140; but if they are not active, the program proceeds to 131 where the logic determines weather or not the present time falls during a holiday or is a time previous to a pending control period. If it is not a holiday or if the time is during or after a control period which may occur, the program advances to 140; but if a holiday is active or if the time is previous to a control interval the program proceeds to 132 where to logic determines whether or not the temperature measured by temperature sensor 84 is within predetermined limits. If the temperature is not within limits the program advances to 140; but if the temperature is within limits the program proceeds to 133 where the logic reads input 54 from the thermostat 53 to determine if the thermostat is requiring the air conditioner to operate because at this point the logic knows that the air conditioner is probably running undisturbed in its natural operating cycle at the temperature range of interest. If the thermostat input is active, the program proceeds to 134 where the logic retrieves the one minute average demand in kW from the power usage interface 83 via the analog to digital data converter circuit 76 and the input data port 73. The power sensor 48 measures the energy usage of the controlled load 45 and supplies the information to the power usage interface 83 via line 49. The one minute demand information is added to previously obtained data to obtain a sum of the demand over a predetermined interval. The one minute demand is compared to a data storage location in the memory 87 to determine if a maximum level of demand has been obtained. If so, the old value is replaced with the new value to establish a new maximum demand. The program then steps to 135 where an interval counter is incremented to indicate the interval occurred. If at 133 the thermostat input is inactive, the program proceeds to 135 where the logic increments the interval counter to indicate the interval occurred. However, since the load is inactive, no one minute demand energy is available and none is therefore added to the previously obtained demand information. The program then steps to 136 where the interval counter is interrogated to determine if the number of data samples is sufficient for further processing. If not sufficient, the program steps to 140; if sufficient, the program continues at 137 where the natural demand sum is divided by the number of intervals to obtain the natural demand, i.e., the average demand of the load during the interval. Following 137 the program steps to 138 to remove the oldest natural demand data from an array of natural demand data storage locations in the memory 77 and inserts the newly accumulated natural run time data into the array. At 139, the logic accesses the natural demand usage data stored at 77 to determine an average value for the natural demand. In the case shown, the logic sums the array and divides the total by the number of entries in the array to obtain the average and this is stored in the temporary memory 71 for subsequent use as the natural run time value. The logic at 139 stores the new natural demand value in the memory 87 to preserve it in the event of a power failure which would cause the memory 71 to lose its contents.

In the routine as described, the interval wherein the absence of a utility control signal, the absence of a predetermined timed control period, and with the temperature in a predetermined temperature range, the controller logic 39 will collect the operating demand data and determine the natural demand value. This is the most realistic time to collect usage data because at other times when control is active, has just been active, or the temperature is not within limits constraints are imposed on the operation of the monitored load such that the operating data may not reflect the true operation patterns. The program then steps to 140 where it would also arrive if any of the prior conditional tests failed and the logic did not follow the previously discussed path. At 140, the logic determines if a control period is active and if not the program steps to 149; if a control period is active the program steps to 141 to determine if the temperature is in the prescribed temperature range for control. If the temperature is not in the control range, the program steps to 149; if the temperature is in the control range, the program steps to 142 where it accesses operational data from memory 87 to determine the preselected control method in which to operate. The program then steps to 143 where the appropriate formulas and operating parameters are retrieved and the calculations are made to determine the off time, the amount of time the controlled load will be locked off, to be used during each control cycle. At 144 the newly calculated off time is compared to predetermined limits and adjusted to the limits if required, to assure a realistic value is achieved from the calculations. The program then steps to 145 where input line 54 is again interrogated to see if the thermostat 53 is requiring the load to be on. If the signal on line 54 is not requesting operation, the program steps to 151 where the load switch 38 is deactivated to prevent operation of the controlled load; if the signal on line 54 is requiring the load to be on, the program steps to 146 where the logic decrements a down counter register in memory 71 which is used as a clock to define the control cycle. If decrementing the cycle register results in zero or a negative count, the logic accesses the preselected cycle period from non-volatile memory 87 and resets the counter to the full cycle period. At 147 the time remaining on the cycle clock is compared to the newly calculated off time to determine if either the on time or off time interval of the cycle is active. If the cycle count is less than or equal to the calculated off time, the logic steps to 151, which is also the negative route from 145, where the load switch 38 is deactivated to prevent operation of the controlled load; if the cycle count is greater than the calculated off time, the program steps to 148 where the load switch 38 is activated to enable operation of the controlled load.

In the routine as described, a negative route from 140 or 141 steps the program to 149 where input line 54 is again interrogated to see if the thermostat 53 is requiring the load to be on. If the signal on line 54 is not requesting operation, the program steps to 151, which is also the negative route from 145 and 147, where the load switch 38 is deactivated to prevent operation of the controlled load; if the signal on line 54 is requiring the load to be on, the program steps to 150 where the cycle clock is decremented and reset if required as described at 146. The cycle clock is decremented in this manner to force the cycle clock to be as random in its cycle as the operation of the controlled load is random in its operation. This precaution leads to a random overall system when many of these controllers compose the system. After operation at 150 the program steps to 148, which is also the positive route from 147, where the load switch 38 is activated to enable operation of the controlled load.

Figures 7, 8, 9, 10:
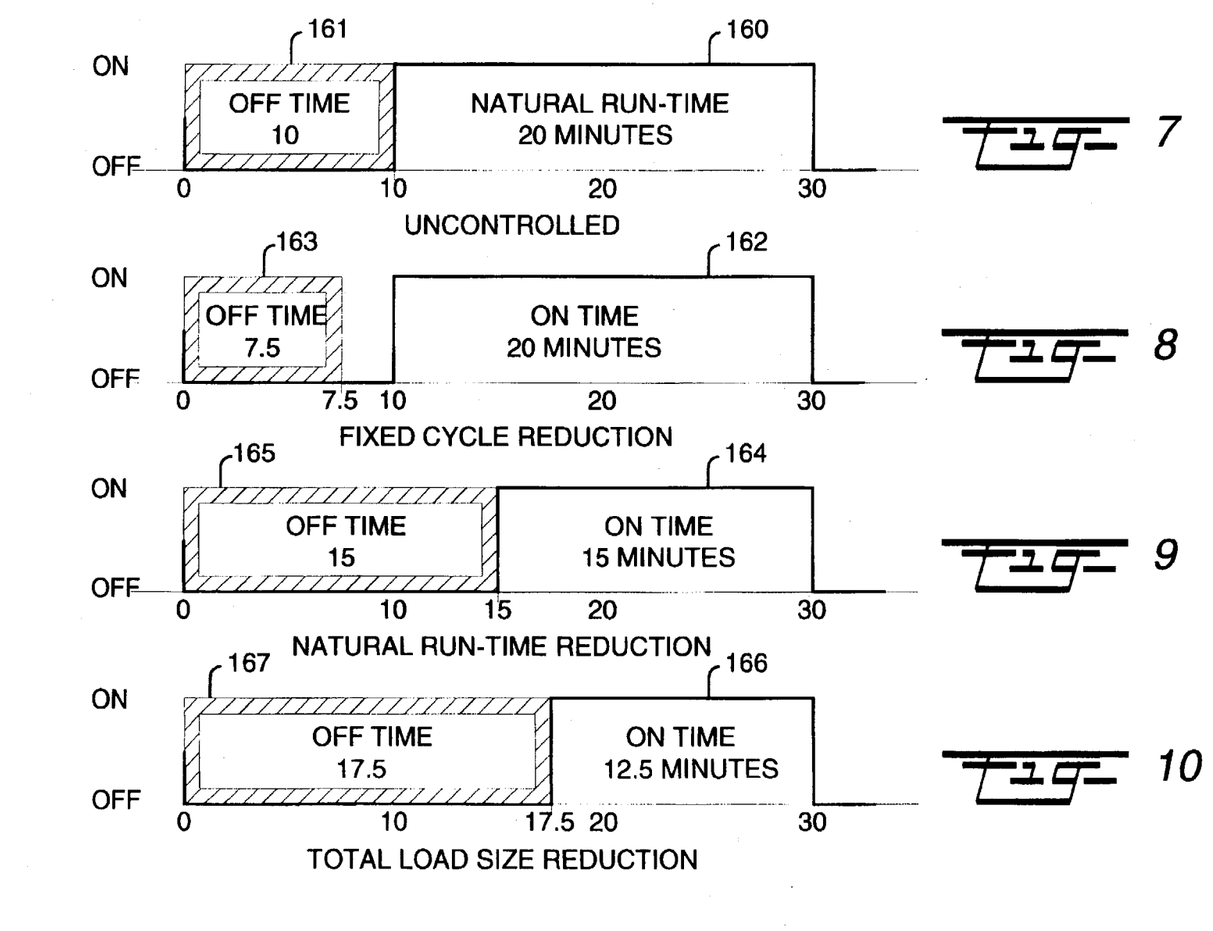
FIGS. 7, 8, 9, 10, 11, 12, 13 and 14 are graphs depicting energy curves generated in response to utility control parameters when applied to a limit controller in accordance with the present invention.

FIGS. 7 to 10 graphically illustrate the effect of adaptive cycling produced by the controller 39 on a controlled load by comparing the results of different control methods on a sample load profile as displayed in FIG. 7. Specifically FIG. 7 represents the idealized on time period 160 and off time period 161 for a fixed load which has had it natural run time calculated by the logic circuit 39. FIG. 7 indicates that the natural run time for the load is twenty minutes out of a 30 minute interval when the load is allowed to run freely in the temperature range of interest. FIGS. 8, 9, and 10 show the results of three control methods when control is activated and a 25 percent reduction is specified for each control method.

FIG. 8 shows the results of control by the traditional fixed cycle reduction method where the off time 163 is 7.5 minutes or 25 percent of the overall cycle. Obviously, the fixed cycle reduction method does not create any load reduction because the time the load is held off is less than the time the load normally keeps itself off and the on time 162 may be equal to or greater the value of the natural run time which is 20 minutes.

FIG. 9 shows the results of control when the logic circuit 39 calculates the off time for control by using the natural run time reduction method. In this method, the 20 minute natural run time is reduced by 25 percent to yield a reduced on time 164 of 15 minutes. The off time 165 is then calculated to 15 minutes which is equal to 30 minutes less the selected on time 164 of 15 minutes. Thus the natural run time reduction method reduces the normal run time of the controlled circuit, and thereby the energy usage, by the desired 25 percent.

FIG. 10 shows the results of control when the logic circuit 39 calculates the off time for control by using the total load size reduction method. This method is used when it is desired to reduce the load by a percentage of its full load energy usage, i.e., to reduce the full load of an 8 kW compressor by 25 percent would yield a fixed 2 kW reduction regardless of the average load the compressor might draw. More specifically, if the average load of an 8 kW compressor is 6 kW, the load is reduced by 25 percent of its full load, 2 kW, to make the average load during control periods 4 kW. To calculate the off time 167 for this method, consider the load to be running all of the time so that a 25 percent reduction in operation would yield a 7.5 minute off time. Since the natural off time is 10 minutes, add the 7.5 minutes to the 10 minutes to yield an off time 167 of 17.5 minutes and an on time 166 of 12.5 minutes as shown in FIG. 10.

Figure 11:
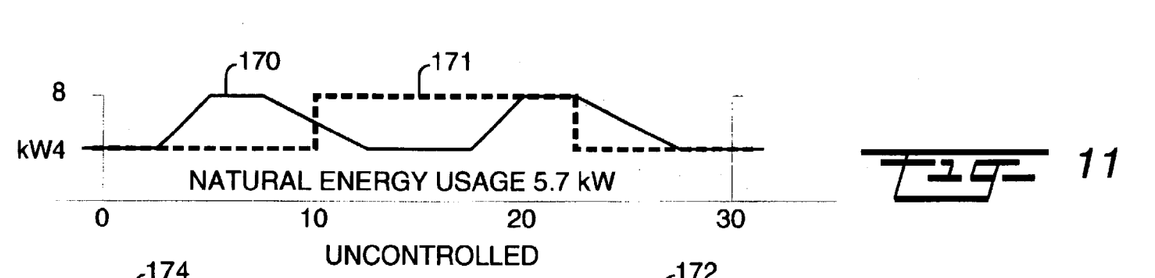
Figure 12:
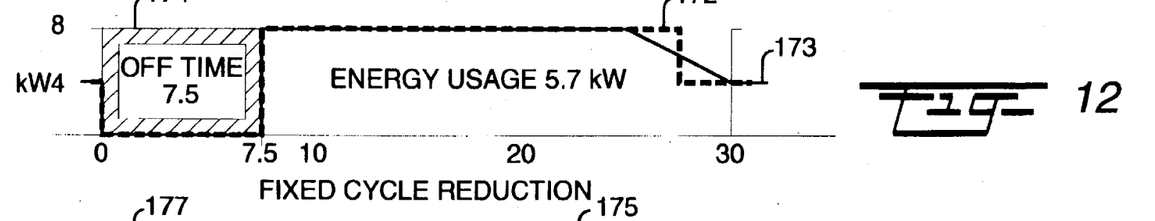
Figures 13, 14:
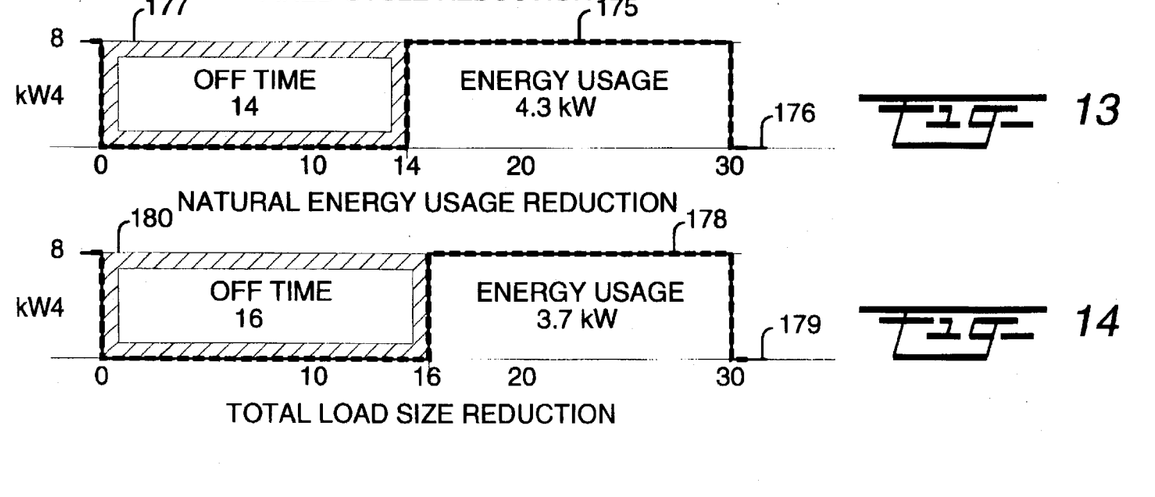

FIGS. 11 to 14 graphically illustrate the effect of adaptive cycling produced by the controller 39 when a variable demand load is controlled. A variable demand load is a load which operates at various power levels to maintain the desired output. Specifically FIG. 11 shows the load pattern for two types of variable loads which are running freely at the desired load output. Line 170 represents a load that can vary its usage linearly between a high and low limit. Dashed line 171 represents a load with two or more discrete power levels. Both lines 170 and 171 also represent a load pattern which has an average energy usage of 5.7 kW during the 30 minute period shown and this energy usage is defined as the natural energy usage of the load and is comparable to the value generated by the logic circuit 39 for this purpose. FIGS. 12, 13, and 14 show the results of three control methods when control is activated and a 25 percent reduction is specified for each control method.

FIG. 12 shows the results of control by the traditional fixed cycle reduction method where the off time 174 is 7.5 minutes or 25 percent of the overall 30 minute cycle. As can be seen from lines 172 and 173, the fixed cycle reduction method does not create any load reduction because variable demand loads increased their demand usage during the allowed on time period to produce the desired output, i.e., the energy usage is still 5.7 kW which is equal to the natural energy usage of 5.7 kW.

FIG. 13 shows the results of control when the logic circuit 39 calculates the off time for control by using the natural energy usage reduction method. In this method, the 5.7 kW natural energy usage is reduced by 25 percent to yield a reduced energy usage target of 4.3 kW and the off time 177 is adjusted to 14 minutes to force the load to cycle at the reduced energy usage rate. Thus the natural energy usage reduction method reduces energy usage of the controlled load by the desired 25 percent as shown by lines 175 and 176.

FIG. 14 shows the results of control when the logic circuit 39 calculates the off time for control by using the total load size reduction method. This method is used when it is desired to reduce the load by a percentage of its full load energy usage, i.e., to reduce the full load of an 8 kW compressor by 25 percent would yield a fixed 2 kW reduction regardless of the average load the compressor might draw. More specifically, if the average load of an 8 kW compressor is 5.7 kW, the load is reduced by 25 percent of its full load, 2 kW, to make the average load during control periods 3.7 kW. To operate at 3.7 kW, the load must be on for 14 minutes (30*3.7/8=13.9=approximately 14) which yields an off time 180 of 16 minutes (30−14=16). The lines 178 and 179 define an on time period of 14 minutes which yields 3.7 kW which is the desired reduced load.

From the foregoing the present invention is seen to provide a method of energy management in which each air conditioner or other variable energy usage device is provided with an adaptive load cycler including means responsive to a control signal, either remotely generated or self generated from local time, temperature and humidity measurements. The adaptive load cycler will monitor and store run times and/or energy use, and compute and store average run times and/or average energy use for specified temperature and humidity ranges. The average run times and/or average energy use will be constantly updated by the adaptive cycler and when a new control signal is received or determined the adaptive cycler will use the latest average received to determine the desired energy or run time reduction. The new average established by the adaptive cycler is based on run times or energy use derived from the average run times or energy use over predetermined real time intervals preceding the application of the control signal. Of course, average use or average run times may be established in various ways, such as, measuring the total in a fixed time interval, by integrating the data equation to find an average, differentiating the data equation to find rates of change, or the use of linear regression on the data to predict a trend.

It is therefore to be understood that various modifications and changes may be made in the method and system of the present invention as herein described without departing from the spirit and scope of the present invention as defined by the appended claims.

We claim:

1. In a method for reducing energy delivered by a utility to each of a plurality of energy usage devices representing but a proportion of total power consumption of each of a plurality of consumers wherein each said device has a variable demand for energy, there being a power source and means for delivering power to each said device, the steps comprising:

a) measuring at least one of ambient temperature and humidity conditions;

b) measuring a selected one of average run time and average energy use of each said device over time intervals of predetermined duration;

c) generating a control signal to modify the power consumed by each said device when one of said ambient conditions exceeds a predetermined level; and d) modifying a selected one of said run time and energy use by each said device by an amount correlated with one of said average run time and energy use measured in step b) herein when said control signal is generated.

2. In the method according to claim 1, including the step of monitoring and storing said selected one of said run time and energy use measurements over a plurality of said time intervals, and calculating and storing said selected one of said average run time and average energy use for each of a preselected range of one of said ambient temperature and humidity conditions of each said device and continuously updating said selected one of said average run time and energy use only during periods in which said control signal is not present.

3. In the method according to claim 1, including the step of monitoring time to generate a control signal when selected ranges for time, temperature and humidity are encountered.

4. In the method according to claim 1, including the step of restricting run time of each device when a control signal is generated to a percentage of said average run time measured.

5. In the method according to claim 4, including the step of restricting the run time of each device to a percentage of the average run time less than the average run time of said device for the time, temperature and humidity conditions of said device when the control signal is generated.

6. In the method according to claim 4, including the step of restricting the energy use of each device to a percentage of the average energy use less than the average energy use of said device for the time, temperature and humidity conditions of said device when the control signal is generated.

7. In the method according to claim 4, including the step of restricting the run time of each device to a fixed time less than the average run time of said device for the time, temperature and humidity conditions of said device when the control signal is generated.

8. In the method according to claim 4, including the step of restricting the energy use of each device to a fixed amount less than the average energy use of said device for the time, temperature and humidity conditions of said device when the control signal is generated.

9. In the method according to claim 1, including the step of restricting energy use of each device during peak power or critical energy use periods to a percentage of said average energy use measured.

10. In the method according to claim 1, including the step of restricting the run time of each device to a fixed amount less than said average run time of said device in response to said control signal for the time, temperature and humidity conditions of said device during peak power or critical energy use periods.

11. In the method according to claim 1, including the step of restricting the energy use of each device to a fixed amount less than the average energy use of said device in response to said control signal for the time, temperature and humidity conditions of said device during peak power or critical energy use periods.

12. In the method according to claim 1, including the step of providing selected control parameters for different periods of the year to optimize control during said periods.

13. In a method for reducing energy delivered by a utility to each of a plurality of energy usage devices including at least one auxiliary load device and at least variable load device representing a portion of the total power consumption of each of a plurality of consumers, there being a power source and means for delivering power to each said device, the steps comprising:

a) measuring at least one of outdoor ambient temperature and humidity conditions;

b) measuring a selected one of average energy use and run time of each said variable load device over time intervals of predetermined duration;

c) generating a control signal to modify the power consumed by each said variable load and auxiliary load device when at least one of said outdoor ambient conditions exceeds a predetermined level;

d) modifying a selected one of said run time and energy use by each said variable load device by an amount correlated with one of said average run time and average energy use measured in step b) herein when said control signal is generated; and e) restricting the run time and energy use of each said auxiliary load device independently of said variable load device when said control signal is generated.

14. An adaptive load cycler for the controlled reduction of energy delivered by a utility to each of a plurality of energy usage devices which represent a portion of the total power consumption of each of a plurality of consumers wherein there is provided means for supplying power to each said device and each said device has a variable demand for energy, the combination therewith comprising:

a) first means for measuring a selected one of average run time and average energy use of each said device over time intervals of predetermined duration;

b) second means for measuring a selected one of outdoor ambient temperature and humidity conditions;

c) signal means for generating a control signal and transmitting said control signal to each said device whereby to modify the power consumed by each said device when at least one of said outdoor ambient temperature and humidity conditions exceeds a predetermined level; and d) logic control circuit means for modifying a selected one of said run time and energy use by each said device by an amount correlated with one of said average run time and energy use as measured by said first means when said control signal is generated.

15. An adaptive load cycler according to claim 14, including programmable control circuit means for monitoring and storing said run time and energy use measurements over a plurality of time intervals of predetermined duration and including means for calculating and storing said selected one of said average run time and average energy use for each of a preselected range of one of said outdoor ambient temperature and humidity conditions, and means for continuously updating said selected one of said average run time and average energy use only during periods in which said control signal is not present.

16. An adaptive load cycler according to claim 15, wherein said programmable control circuit means includes means for restricting run time of each said device when a control signal is generated to a percentage of said average run time measured.

17. An adaptive load cycler according to claim 15, said programmable control circuit means including means for restricting energy use of each device during peak power or critical energy use periods to a percentage of said average energy use measured for each respective of said devices.

* * * * *